(12) United States Patent
Numminen et al.

(10) Patent No.: US 6,687,499 B1
(45) Date of Patent: Feb. 3, 2004

(54) METHOD AND SYSTEM FOR TESTING THE FUNCTIONING OF DATA COMMUNICATION IN A RADIO APPARATUS

(75) Inventors: Jussi Numminen, Turku (FI); Markku Lintinen, Kangasala (FI); Jukka Kinnunen, Tampere (FI); Juha Savolainen, Tampere (FI); Pekka Jokitalo, Oulu (FI); Esa Nokkonen, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/537,519

(22) Filed: Mar. 29, 2000

(51) Int. Cl.⁷ .................................................. H04Q 7/20
(52) U.S. Cl. .................... 455/423; 455/67.4; 455/422.1; 375/224; 370/242
(58) Field of Search ................................ 455/67.4, 423, 455/418, 419, 425; 375/224, 225, 226, 227; 370/242, 252

(56) References Cited

U.S. PATENT DOCUMENTS

| | | | | |
|---|---|---|---|---|
| 4,910,794 A | * | 3/1990 | Mahany | 455/67.4 |
| 5,784,406 A | * | 7/1998 | DeJaco et al. | 375/224 |
| 5,937,345 A | * | 8/1999 | McGowan et al. | 455/410 |
| 5,943,617 A | * | 8/1999 | Nakamura | 455/423 |
| 6,542,538 B2 | * | 4/2003 | Fischel et al. | 375/224 |

* cited by examiner

Primary Examiner—William Trost
Assistant Examiner—Danh C Le
(74) Attorney, Agent, or Firm—Perman & Green, LLP

(57) ABSTRACT

To test the functioning of downlink data communication a mobile station comprises means (301, 302, 303, 304, 326) for receiving a signal in the downlink direction and means (331, 310, 311, 312, 313) for sending a signal uplink. It receives a test signal in the downlink direction (301, 302, 602) and compares the received test signal to a known form of the test signal (208, 603). In addition, the mobile station stores information produced by the comparison about errors detected in the received test signal (209) and sends uplink a signal representing the information stored (312, 313, 604).

19 Claims, 4 Drawing Sheets

METHOD AND SYSTEM FOR TESTING THE FUNCTIONING OF DATA COMMUNICATION IN A RADIO APPARATUS

TECHNOLOGICAL FIELD

The invention relates in general to testing the functioning of radio apparatus. In particular the invention relates to testing the functioning of a digital radio apparatus on the basis of error statistics. The description of the invention especially focuses on type approval testing of the functioning of a radio apparatus but the functioning of radio apparatus is of course tested in many other contexts as well, e.g. during product development, manufacture, repair and service. In addition, the invention is applicable even during normal use of the radio apparatus.

BACKGROUND OF THE INVENTION

New digital radio apparatus (digital mobile phones, for example) intended for operation in public data communication networks are tested for type approval prior to being introduced into the market. The equipment and methods used in the testing are usually defined in data communication network standards. FIG. 1 illustrates a known test arrangement in which testing is directed to a mobile station (MS) 101 of a cellular radio system. The mobile station may also be called user equipment (UE). A simulation system (SS) 102 simulates a cellular radio system during the test. Testing the functioning of data communication requires an active data link 103 between the SS and MS, which may be a radio link or a wire link through a testing interface at the mobile station.

Tests usually employ a technique in which a mobile station receives a downlink frame from the SS and sends back to the SS a corresponding uplink frame which contains the equivalent number of bits. The mobile station may even recycle to the SS the same individual bits that it received in the downlink direction. The SS examines whether the transfer of data or the operation of the mobile station have caused errors in the frame. Arrow 104 depicts the loopback. The arrangement has been suitable for testing the mobile stations of known cellular radio systems since in the known systems the data link capacity has been distributed symmetrically: the capacities of uplink and downlink data communication have been equal. In mobile stations of new cellular radio systems, however, it is necessary to test functions that involve asymmetric distribution of data communication capacity between uplink and downlink data communication. For instance, in functions relating to the browsing of information networks the downlink data communication capacity may be manyfold compared to the uplink capacity. The arrangement according to the prior art will then not work because all the bits of the received downlink frames will not fit in the uplink frames. In addition, mobile stations of new cellular radio systems may include functions based on unidirectional downlink data communication the testing of which naturally is impossible using the method according to the prior art.

From an earlier Finnish patent application no. 981267 by the applicant, which application has not become public by the priority date of this present application, it is known an alternative testing procedure suitable for the testing of data communication arrangements with asymmetric capacities. In said procedure a mobile station selects from tie bits of the downlink frame only a portion which is looped back to the uplink frames. The disadvantage of such an arrangement is that errors in those bits of the downlink frame that are not looped back uplink will remain undetected. In addition, this arrangement, too, is unsuitable for testing unidirectional downlink data communication links.

SUMMARY OF THE INVENTION

An object of the present invention is to provide a method for testing the functioning of a digital radio apparatus, which method is also suitable for testing the functioning of data communication arrangements which have asymmetric capacities or are unidirectional. Another object of the invention is that the method according to the invention can also be utilized in conjunction with the normal use of the digital radio apparatus.

The objects of the invention are achieved by including in the digital radio apparatus tested a circuit that can produce a copy of the test data used in the test. Thereby, error statistics can be compiled at the digital radio apparatus tested so that only the statistical results need be transmitted uplink. The uplink connection can be entirely separate from the downlink connection.

The method according to the invention is characterized in that it is comprised of steps wherein a test signal is received in the downlink direction, the test signal received is compared with a known form of the test signal, information produced by the comparison about errors detected in the received test signal is stored, and a signal representing the information stored is sent uplink.

The invention is also directed to a mobile station of a cellular radio system, characterized in that it comprises means for comparing a received signal to a known form of the signal and for storing the information produced by such comparison and for sending it uplink, which information represents errors detected in the received test signal.

In order to test functions relating to data communications the simulation system produces a pseudorandom bit sequence or other test sequence which is packed into downlink frames and sent to a mobile station. In accordance with the invention a circuit is included in the mobile station which is capable of producing the same test sequence as the simulation system. Thus the mobile station receiving downlink test data knows bit by bit what the received test data frames should contain. By comparing the received bit sequence to the sequence it has produced itself it can detect errors in the received sequence and compile various error statistics in the form of bit error ratio (BER) or frame erasure ratio (FER), for example. The uplink connection is only needed to convey these statistics to the simulation system, so that at best the need for uplink data transmission is only a fraction of the need for downlink data transmission. In general it can be said that the mobile station performs an error analysis of the received bit sequence using a bit sequence produced by the mobile station itself and sends to the simulation system information about the results obtained from the analysis.

The uplink data connection need not be associated with the downlink data connection at all. A so-called Bluetooth link has been proposed for new electronic apparatus to provide a short-range wireless data link between at least two apparatus. A mobile station can send information about the analysis results to the test equipment via the Bluetooth link.

The bit sequence generator and comparator circuit according to the invention may also be used when a mobile station is used in the normal manner as a mobile communication device in a cellular radio system. In many cases it is advantageous if the mobile phone or other such mobile station of a cellular radio system is able to examine the amount of errors in data received from a given base station. To perform such a measurement a base station may send a pseudorandom bit sequence such that the mobile station is able to produce the same sequence by means of its own generator and make the necessary comparisons in order to detect and record the errors that occurred in the downlink data transmission. Such a measurement may be applied e.g. to determine the strength of channel coding in the downlink transmission or in connection with a handover in order to find the best possible new base station.

The invention does not in any way limit the amount of error data sent uplink by the mobile station. According to an embodiment of the invention a great number of mobile stations can during normal operation compile statistics of errors detected in the downlink data transmission in connection with the operation of the mobile station and send corresponding data via base stations to fixed parts in the cellular radio system. If data are sent uplink relatively seldom their transmission will not take up a considerable portion of the data communication capacity available. At certain points of the network these data can be collected and combined e.g. with the information about the geographical locations of base stations, thus realizing automatic and continuous monitoring of the quality of service provided by the network. The network operator may use these data in network development, for example, so as to enhance network coverage.

BRIEF DESCRIPTION OF DRAWINGS

The invention will now be described in greater detail, referring to the preferred embodiments presented by way of example and to the accompanying drawings where.

Figure 1:
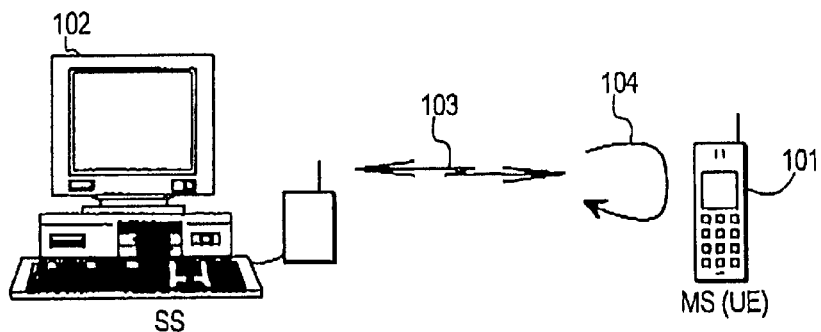
FIG. 1 illustrates testing according to the prior art.

Above in conjunction with the description of the prior art reference was made to FIG. 1, so below in the description of the invention and its preferred embodiments reference will be made mainly to FIGS. 2 to 6.

DETAILED DESCRIPTION OF THE INVENTION

Figure 2:
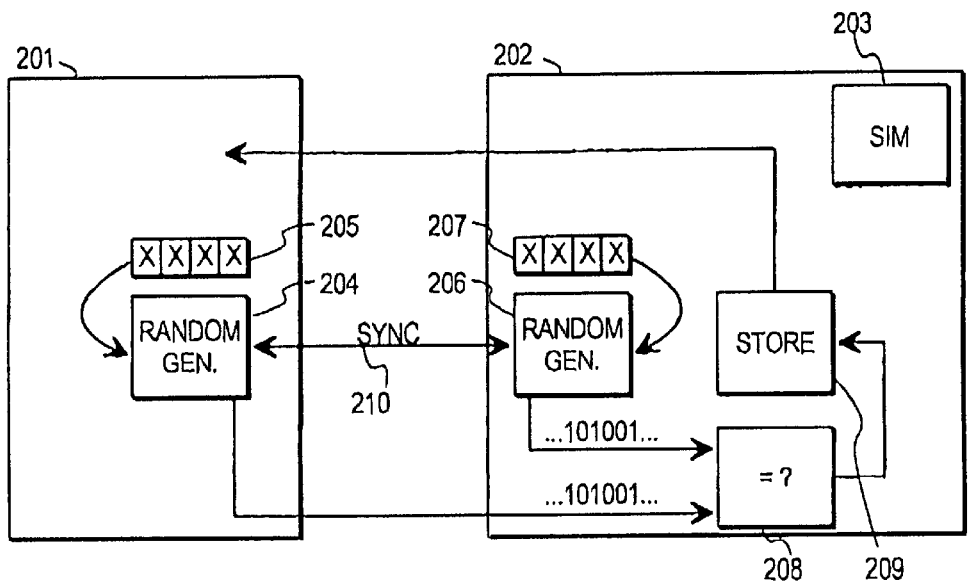
FIG. 2 illustrates the principle of the invention.

FIG. 2 shows an arrangement in which a mobile station 202 to be tested is connected in a known manner to test equipment 201. It is usually advantageous from the testing standpoint that the mobile station 202 is equipped with a subscriber identity module (SIM) 203 designed specifically for testing purposes, which SIM may be a smart card like the SIM card widely used in mobile stations or a special SIM simulator which establishes the necessary connections between the SIM interface in the mobile station and a special equipment simulating the operation of a SIM. However, the invention does not require the use of a particular SIM.

In a known manner the test equipment 201 comprises a bit sequence generator 204 which is initialized using a certain so-called seed 205 and which then produces a pseudorandom bit sequence. In accordance with the invention the mobile station comprises a functionally identical bit sequence generator 206 which also is initialized using a certain seed 207. It follows from the general principles applying to pseudorandom bit sequence generators that if the seeds 205 and 207 are identical, generators 204 and 206 will produce exactly identical pseudorandom bit sequences.

In accordance with the invention the mobile station 202 also comprises a comparator circuit 208 and statistical unit 209 which are adapted so as to compare bit by bit the bit sequence received from the test equipment to the locally produced bit sequence and to compile statistics of the differences detected. In addition, there is an uplink connection from the statistical unit 209 back to the test equipment so that the resulting statistics can be sent to the test equipment. This connection may be an uplink channel in the same data connection via which the downlink signal was sent from the test equipment 201 to the mobile station 202 or it may be some other connection such as a Bluetooth connection.

For the comparison of pseudorandom bit sequences to be meaningful, the bit sequence generators 204 and 206 must operate in a synchronized manner, i.e. they have to generate the same bits at the same pace. The synchronization of the generation of bit sequences is known per se because in spread spectrum technology in general and specifically in code division multiple access (CDMA) methods the differentiation of a given utility signal from rivaling utility signals and noise is based on using one and the same pseudorandom spreading sequence at both the transmitting and receiving end. In connection with the invention it is possible to use a known technique to synchronize the generation of the bit sequences. In FIG. 2, synchronization is schematically depicted by an arrow 210.

Through the uplink connection it is possible to send e.g. a stored bit error ratio or frame erasure ratio value or a value derived from them, such as a mean bit error ratio over a time span. Many applications are only interested in whether the bit error ratio or frame erasure ratio stays below a predetermined limit, in which case only a yes/no type answer (is smaller than limit value/is not smaller than limit value) need be sent uplink. Since limit values are usually defined as exponential numbers (say, $1.0 \cdot 10^{-6}$), one possibility is to sent uplink the exponent x of the number $1.0 \cdot 10^{-x}$ which which represents the upper limit value of the observed bit error ratio. Thus e.g. number −6 sent uplink would indicate that the observed bit error ratio is smaller than $1.0 \cdot 10^{-6}$.

Figure 3:
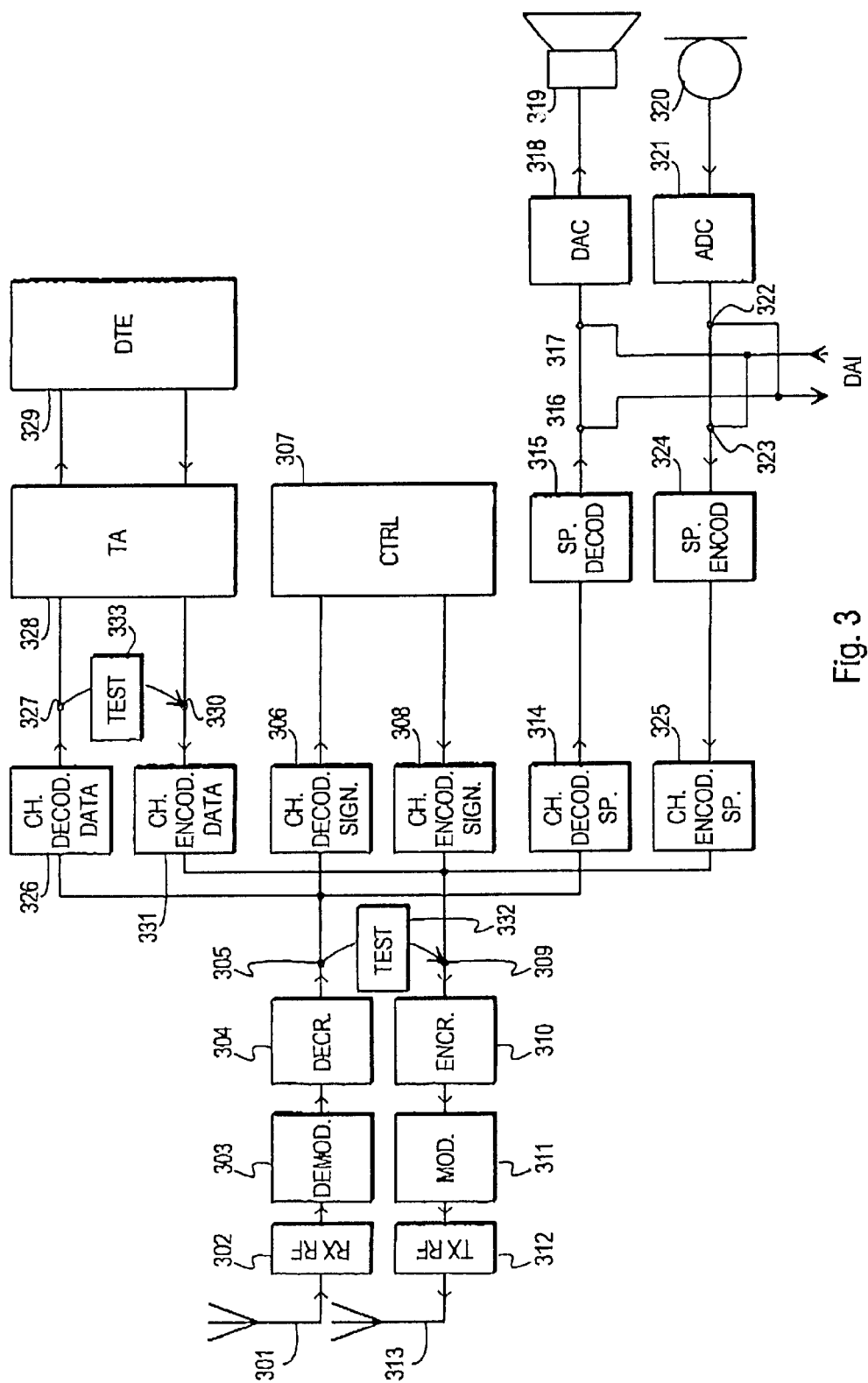
FIG. 3 shows a block diagram of a mobile station according to the invention.

FIG. 3 shows a block diagram of a mobile station to which the invention can be applied. The mobile station shown is a mobile phone equipped with data channels, but the applicability of the invention is not limited to mobile phones. Interface 301 is an antenna interface via which the downlink radio frames (produced by the test equipment in the case of testing) are brought to the mobile station. Block 302 represents in general all the radio-frequency (RF) and intermediate-frequency (IF) parts, known per se, by means of which a received RF signal is converted to baseband. The information contained in the baseband signal is reconstructed in a demodulator 303 and possible encryption is removed in a decryption block 304. From this point on, which is called point 305, the processing of the received information will differ depending on whether it is signaling, digitized speech or data.

Information on signaling channels is directed to a channel decoder 306 and thence to a control block 307 which is a microprocessor and controls the operation of the mobile phone. The information for uplink signaling channels is produced in the control block 307 and channel encoded in block 308. From point 309 on the channel encoded uplink signaling information is processed just as any other uplink information, i.e, it is encrypted in an encryption block 310, added to baseband oscillation by means of modulation in a modulator 311 and mixed to RF in the generic block 312 representing the transmit (TX) branch RF parts, whereafter it can be transmitted through the antenna interface 313. The antenna interfaces 301 and 313 may be one and the same antenna interface if mixing of uplink and downlink information is prevented by means of a suitable duplexer block (not shown).

Downlink digitized speech is directed from point 305 to a speech channel decoder 314 that produces a signal which is further speech decoded in block 315. Points 316 and 317 constitute part of a digital audio interface (DAI) through which digital speech information processed by the mobile station can be monitored in the test equipment. Ignoring the DAI, there is a direct connection from the speech decoder 315 to a D/A converter 318 that converts speech information into analog format so it can be reproduced by a loudspeaker 319. In the uplink direction, a microphone 320 records speech that is converted digital in an A/D converter 321 and can then be conducted via the DAI to the test equipment; this part of the DAI is represented by points 322 and 323. Digitized speech may also be directed from block 321 direct to a speech encoder 324 and thence to a channel encoder 325 for speech channels and further to point 309 front which point on its processing will continue as described above for uplink signaling information.

Downlink information that belongs to data channels is conducted from point 305 to a channel decoder 326 for data channels. When the mobile phone is used together with external data terminal equipment the channel decoded information associated with data channels is directed via point 327 to a terminal adapter 328 and thence further to the external data terminal equipment 329. Correspondingly, uplink information associated with data channels is directed from the data terminal equipment 329 via the terminal adapter 328 and point 330 to a channel encoder 331 for data channels which channel encodes the data which then are conducted from point 309 toward the antenna interface 313 as was described above for uplink signaling information.

The blocks shown in FIG. 3 are not necessarily separate in a real mobile phone but e.g. the channel encoding and decoding blocks 306, 308, 314, 325, 326 and 331 can be realized by a single circuit which is programmed to operate in various ways depending on whether it is processing signaling, speech or data. However, it is customary to examine the blocks shown in FIG. 3 as separate blocks because it helps understand the operation of the mobile phone.

The comparison according to the invention of a received pseudorandom bit sequence to a locally produced bit sequence may be realized at many points in FIG. 3 depending on the part the operation of which is to be tested. This patent application deals with two exemplary embodiments of the invention. In the first embodiment the comparison and generation of error statistics are realized at point 305 and the statistical results are directed to uplink transmission at point 309 in accordance with block 332. In the second embodiment, which tests especially the operation of data channels, the comparison and generation of error statistics are realized at point 327 and the statistical results are directed to uplink transmission at point 330 in accordance with block 333.

FIG. 3 is based on the assumption that uplink information is sent on an uplink transmission channel, whereby blocks 332 and 333 form a test loop between downlink and uplink transmission. If a Bluetooth connection or a corresponding separate data link is used to transmit the uplink information, blocks 332 and 333 must have a connection to the functional block (not shown) that maintains such a separate transmission link.

Comparison and generation of statistics are activated using certain commands that the mobile station to be tested receives from the test equipment. In order to illustrate the background and processing of these commands it will be next described briefly a portion of a cellular radio system protocol stack defined in the specifications of the cellular radio system in question, referring to FIG. 4. The architecture described relates to the so-called Layer 3 protocol signaling in the GSM system, as defined in specification ETS GSM 04.07, although some insignificant simplifications have been made in the figure for the reason of graphic clarity.

Figure 4:
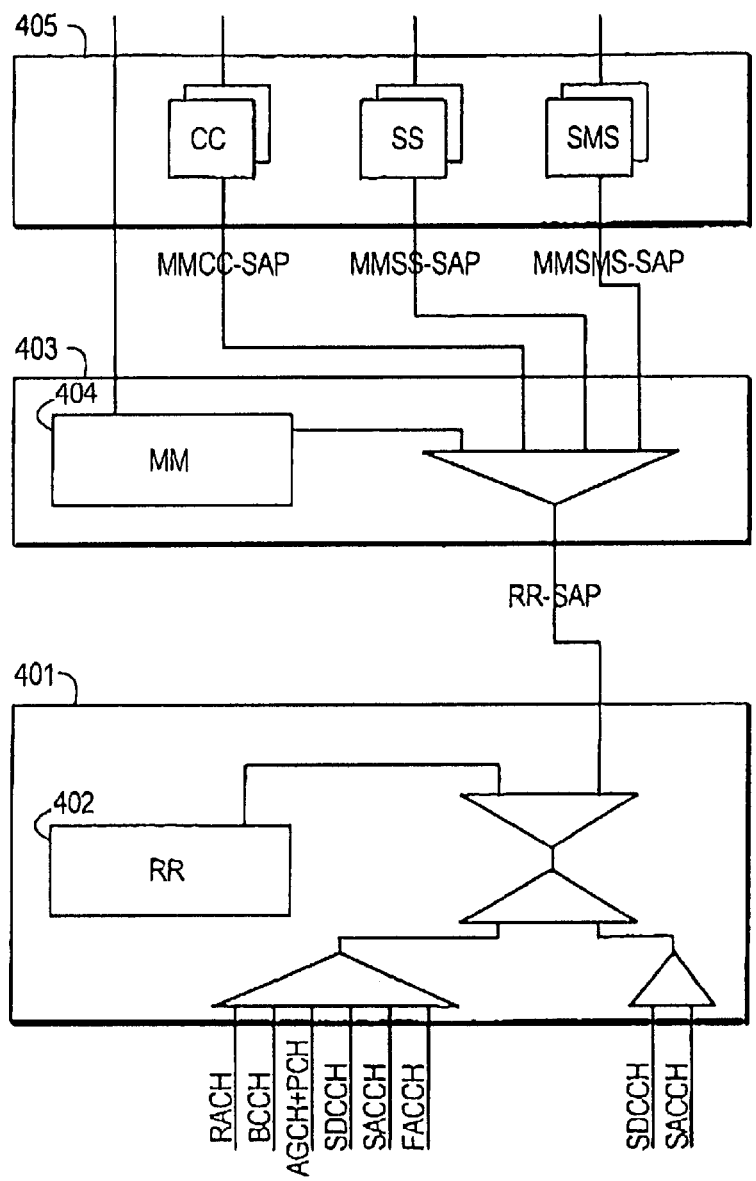
FIG. 4 illustrates the architecture of a protocol level in a data transmission protocol.

The bottom protocol layer 401 in FIG. 4 is a so-called radio resource (RR) management layer which has links downward through several separate logical channels. These channels are the random access channel (RACH), broadcast control channel (BCCH), access grant channel/paging channel (AGCH+PCH), standalone dedicated control channel (SDCCH), fast associated control channel (FACCH) and the slow associated control channel (SACCH). Channels related to radio resource management are connected to an RR block 402, and other channels are connected via the RR service access point (RR-SAP) to the next higher protocol layer, which is the mobility management (MM) layer 403. On that layer, channels related to mobility management are connected to an MM block 404, and other channels are directed via SAPs of their own to layer 405: the connection related to call control is directed via MMCC-SAP to the call control (CC) part of layer 405, the connection related to supplementary services is directed via MMSS-SAP to the supplementary services (SS) part of layer 405, and the connection related to short messages is directed via MMSMS-SAP to the short message services (SMS) part of layer 405. The CC, SS and SMS parts of layer 405 and the MM block of layer 403 have connections to the next higher protocol layer, which is not shown in FIG. 4.

As testing according to the invention of a mobile station is begun, an arrangement according to FIG. 2 is first set up in which the mobile station to be tested is connected in a known manner to the test equipment and test SIM. A mobile terminating (MT) radio link is established between the mobile station and test equipment in accordance with FIG. 5. When the mobile station is on, the test equipment sends to it on the PCH a paging request 501, to which the mobile station responds with a channel request 502 sent on the RACH. After that, the test equipment sends an immediate assignment 503 which may include various instructions for the mobile station. The mobile station sends to the test equipment a set asynchronous balanced mode (SABM) message 504 which in fact is a paging response and is sent on the SDCCH. The test equipment acknowledges the SABM message using an unnumbered acknowledge (UA) 505.

Figure 5:
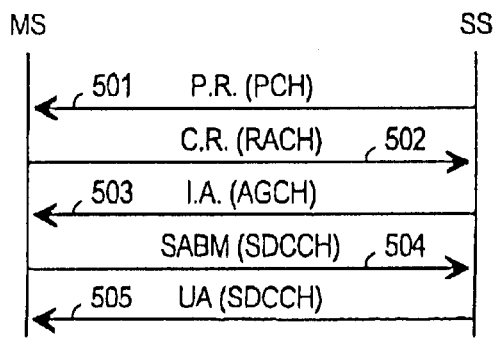
FIG. 5 illustrates the method according to the invention in testing.

The contents and syntax of the messages shown in FIG. 5 are mainly defined in specification GSM 04.08. However, some messages have portions reserved for future extensions, which portions can be used to utilize the messages for the present invention. Particularly the immediate assignment 503 contains so-called rest octets in which the first two bits indicate the contents of the rest of the rest octet. By the priority date of this patent application values 11 and 10 of the values of the first two bits of the rest octet have been reserved but values 01 and 00 are unused. In accordance with a preferred embodiment of the invention at least one of these values can be reserved to indicate that in response to the immediate assignment 503 the mobile station to be tested has to set itself in a special test mode. The test mode is advantageously defined such that even though an RR-level in between the mobile station and test equipment has already been established, the RR layer (layer 401 in FIG. 4) in the mobile station's protocol stack will not inform the MM layer (layer 403 in FIG. 4) about the link. As the MM layer and higher protocol layers do not know about the existence of the radio link, they will not try to disconnect the link because of a supervising mechanism which would e.g. attempt to monitor the error status of the connection.

So test mode means that the mobile station to be tested is instructed to maintain a connection on a certain transmission channel. The mobile station is kept in the test mode by Layer 3 signaling. Defining the test mode as described above and realization of the definition in practice can be easily implemented by a person skilled in the art since the operation of the mobile station is totally controlled by its control block (reference designator 307 in FIG. 3). The control block in turn is a microprocessor which executes a program stored in the memory media available to it. When this program is written such that in response to the reception of a certain Layer 3 command no notification is sent to upper protocol layers, the mobile station can be made to function in the desired manner according to the invention.

When connection has been established in the manner according to FIG. 5 the test equipment can send to the mobile station to be tested any commands that do not require that upper protocol layers, which do not know about the connection, participate in the communication. Below a case is described in which the test equipment wants the mobile station to make comparisons and error statistics in accordance with block 332 between points 305 and 309, referring to FIG. 3. For simplicity, this arrangement can be called a G loop. By way of example, let us especially consider a case in which the transmission channel tested is a HSCSD-type data channel, or such that data belonging to it can be placed in more than one timeslot in a radio frame. Such a channel may also be called a multislot channel.

At first the test equipment sends a comparison and statistical operation start command associated with the data channel, which command can be called CLOSE_Multi-slot_loop_CMD. The close command may include an identifier on the basis of which the mobile station identifies the G loop. Alternatively, it may be specified that if the CLOSE_Multi-slot_loop_CMD does not include an identifier, it refers to the closing of the G loop. For the test equipment to be able to verify that a message sent by it has been received it advantageously starts a timer in connection with the sending, in which case the mobile station must send an acknowledge before the timer expires. The mobile station acknowledges the message using an acknowledge message which can be called CLOSE_Multi-slot_loop_ACK. The mobile station closes, i.e. activates, the test loop in a certain time after it has sent the acknowledge. Compatibility with certain earlier specified functions may require a certain value for that time period. In GSM, an advantageous value is one so-called reporting period, or block length on SACCH, which corresponds to the length of 104 radio frames. In addition, it is advantageous to specify that if the test loop is already closed or the active radio link has not been established in the manner according to FIG. 5, the mobile station will not respond to the CLOSE_Multi-slot_loop_CMD message.

Once the G loop has been activated the test equipment can start sending test data, i.e. periods of a pseudorandom bit sequence packed in downlink frames. In an alternative embodiment the information bits in the downlink frames may also include non-random bit combinations which will be particularly examined for reception errors. Naturally the mobile station tested must know about the use of such bit combinations just as it knows about the use of the pseudo-random bit sequences as described above. Functionally, the transmission and reception of data are implemented at the physical protocol level which is called Layer 1. So, in principle the testing need not involve any one of the higher protocol levels at the mobile station. However, Layer 1 does not allow for any commands relating to the control of the operation of the mobile station but the reception and interpretation of such commands require activity at Layer 3. However, in accordance with a preferred embodiment of the invention, no notification is sent to the upper protocol levels although normal operation would require that the information about the active communications link be sent to all protocol levels up to the application level to the operation of which the data transmitted via the link are related. Naturally the invention does not exclude that another embodiment of the invention conform to the normal procedure as regards the protocol levels.

While the G loop is active the mobile station compares the received bit sequence portions to the locally produced portions and measures e.g. the bit error ratio or frame erasure ratio and compiles statistics of the measurement results in a desired manner. Since the received signal is examined in the G loop prior to channel decoding, the locally produced bit sequence at the mobile station also has to be channel encoded for the comparison to be meaningful. Complete statistics or information elements representing the reception error status in general are sent uplink to the test equipment.

The test equipment receives the uplink frames sent by the mobile station and demodulates and decrypts them so that the statistical results in the received frame can be processed by the test equipment. The signal level at which the downlink frames are delivered to the mobile station can be varied so that the bit error ratio (BER) detected by it represents the sensitivity of the receiver of the mobile station especially at low signal levels. It is typical of type approval tests that a certain minimum sensitivity is required of the mobile station, which means that at a given signal level the bit error ratio must not exceed a predetermined limit value.

At the end of the test the test equipment may instruct the mobile station to release the test loop by sending a special command which can be called OPEN_Multi-slot_loop_CMD. The command need not identify which particular test loop is meant if it has been specified that the mobile station can only have one active test loop at a time. The mobile station opens the test loop and acknowledges the message with an acknowledge message which can be called OPEN_Multi-slot_loop_ACK. In connection with the release of the test loop the mobile station returns from the test mode to the normal operating mode.

Let us next consider a case in which the test equipment wants the mobile station to make comparisons and error statistics according to block 333 between points 327 and 330, referring to FIG. 3. For simplicity, this test loop can be called an H loop. Let us consider a case in which a HSCSD-type data channel is to be tested. The test equipment sends a CLOSE_Multi-slot_loop_CMD which now advantageously includes an identifier on the basis of which the mobile station identifies the H loop. If there can be several different data channels, the data channel in question has to be identified, too. Again, the test equipment advantageously starts a timer in connection with the sending of the message, in which case the mobile station has to send an acknowledge before the timer expires. The mobile station acknowledges the message using a CLOSE_Multi-slot_loop_ACK whereby the test equipment stops said timer. The mobile station activates the test loop in a certain time after it has sent the acknowledge. This time period is preferably the same as in the G loop case described above.

Operation according to the H loop differs from that according to the G loop in that since channel decoding is realized before the data are sent back uplink, the mobile station can also examine whether the received data frames have errors that are revealed by checksums included in the data frames. So, in addition to or instead of the normal error detection and statistical method it is also possible to use a second method. Moreover, the bit sequence produced locally at the mobile station needn't be channel encoded now.

In GSM it is also possible that the mobile station detects in connection with decoding, on the basis of the values of the stealing flags, that the frame contains data related to the FACCH channel. The invention does not limit the handling of such frames in a test situation. An advantageous solution is to let both the uplink and downlink FACCH operate normally in a test situation, specifying no test response for the reception of a frame belonging to the downlink FACCH. The same applies to the SACCH channel. Opening of the H loop is carried out in the same way as opening of the G loop described above.

The following general rules apply preferably to all test loops described above:
 one OPEN_Multi-slot_loop_CMD message shall open all active test loops,
 assignment to a new multislot channel timeslot configuration shall be preceded by an OPEN_Multi-slot_loop_CMD message to open existing test loops,
 it is the responsibility of the test equipment to ensure correct channel configuration for the test,
 termination of an established data link shall open the test loops in the same way as an OPEN_Multi-slot_loop_CMD message,
 changing the transmission power, a new channel assignment or a handover shall not affect the test loops,
 the test equipment shall make sure that a new channel assignment, handover or reconfiguration will not include a timeslot configuration that would affect the test loop,
 once the test loop is closed, a new CLOSE_Multi-slot_loop_CMD message shall override the previous one (multiple CLOSE_Multi-slot_loop_CMD messages are not additive),
 if the data link is terminated and the test loops are therefore opened, there is no need to send a separate OPEN_Multi-slot_loop_CMD message,
 a data channel test loop affects only the data channel in question, not e.g. the operation of FACCH or SACCH channels, and
 data channel test loops have no effect on the operation of possible other simultaneous test loops nor are dependent of them.

In addition to the testing described above the invention is applicable when a mobile station or a terminal of a cellular radio system in general is in normal use, i.e. moving with its user within the area of the cellular radio system. Then it is for most of the time in the so-called idle mode in which it receives from base stations certain downlink messages and sends occasionally location update messages uplink. The cellular radio system knows at all times the location of every idling mobile station with the accuracy of a so-called location area (LA) at least. With current methods it is possible to determine the location of a mobile station even with the accuracy of a cell, and positioning methods have been proposed for future cellular radio systems with which mobile stations could be located even within a cell to a certain point or area.

Figure 6:
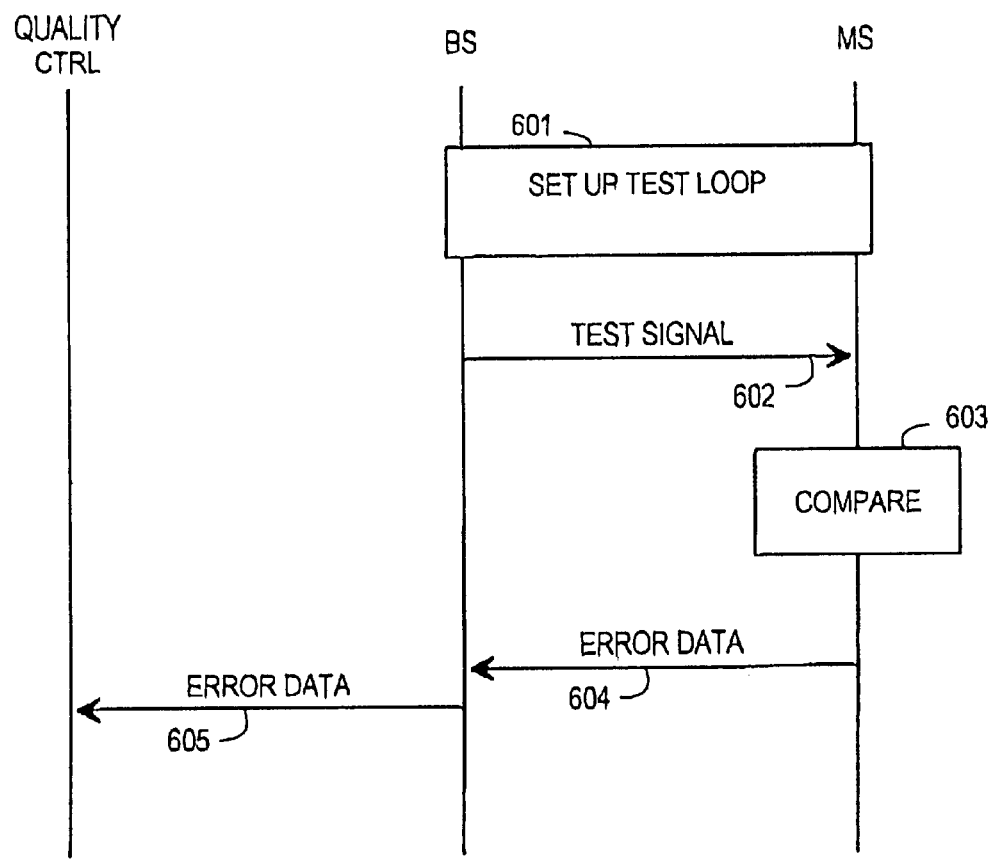
FIG. 6 illustrates the method according to the invention in normal operation of the mobile station.

In accordance with an embodiment of the present invention a test loop can be established between a base station and mobile station during normal operation, wherein the base station and mobile station first agree on the use of a certain (preferably pseudorandom) bit sequence. In FIG. 6, this step is represented by block 601. The sequence may also be a standard sequence reserved for testing purposes in the system, in which case there is no need to separately agree on the sequence but the base station sends the test sequence on a certain test channel and the mobile station becomes synchronized with it in step 601 in a known manner. After successful synchronization the mobile station starts receiving in step 602 the test signal sent by the base station, i.e. frames comprising portions of the test sequence. In step 603 the mobile station compares the received signal to a corresponding locally generated signal and stores statistical information about detected errors in the same manner as described above in connection with the test arrangement proper. At certain intervals the mobile station sends according to step 604 extracts from the stored statistical data to the base station, which sends them further according to step 605 to a quality control station in the cellular radio system.

To prevent the testing described above from taking up an unreasonable amount of radio resources and from significantly adding to the power consumption of the mobile stations, it can be specified that the base station includes portions of the test sequence in some of the messages that would be received in any case by the mobile stations during the idle mode. Likewise it can be specified that mobile stations send the statistical data uplink as part of the messages that they would send in any case e.g. to update their location.

The quality control station of a cellular radio network may collect statistical data sent by mobile stations and received by base stations from different parts of the cellular radio network. Since the statistical data represent errors in downlink data communication and are associated with at least a certain location area and in future cellular radio systems even with positions inside cells, the quality control station can in the course of time form a very accurate and continually updating picture of how error-free the down data communication is in various parts of the cellular radio system. This information can be utilized e.g. in such a manner that in an area where the downlink data communication seems to include more errors than usual the transmission power of base stations is increased or new base stations are built. The method according to the invention may also be used in such a manner that testing is carried out in the area of one base station at a time in order to examine e.g. the operating condition of the base station or the strength of the radio signal in a base station cell. In that case the system does not necessarily need a centralized quality control station but testing can be started even at a base station site by setting the base station into a test mode.

The names and specifications in this patent application associated with particular systems or hardware are given by way of example only and do not affect the applicability of the invention to all mobile communication systems in which a mobile station can operate on data, traffic and control channels. The invention can also be modified in many ways without departing from the scope of the invention defined by the claims attached hereto. For example, in a modification of the invention the activation of a test loop and setting of the mobile station into test mode as well as opening of the test loop and returning of the mobile station into normal mode may be realized in a manner other than through a command sent by the test equipment. It can even be thought that these functions are activated manually by setting a switch or connector in the mobile station into a desired position. However, from the smoothness of testing and automatization perspective it is advantageous that these functions can be realized by commands sent by the test equipment.

What is claimed is:

1. A method for testing the functioning of downlink data communication in a mobile station equipped for receiving a signal in the downlink direction and for sending a signal the uplink direction, the method comprising the steps of:

receiving a test signal in the downlink direction, generating a pseudorandom bit sequence at the mobile station in order to produce a known form of the test signal;

comparing the received test signal to the known form of the test signal, producing and temporarily storing information about errors which were detected in the received test signal during the comparing step; and sending in the uplink direction a signal representing the stored information about errors.

2. A method according to claim 1 wherein the step of producing and temporarily storing information about errors detected in the received test signal during the comparing step comprises the step of producing and temporarily storing information about the detected bit error ratio of the received signal, and the step of sending in the uplink direction a signal representing the stored information about errors comprises the step of sending in the uplink direction a signal representing the detected bit error ratio.

3. A method according to claim 1 wherein the step of producing and temporarily storing information about errors detected in the received test signal during the comparing step comprises the step of producing and temporarily storing information about the frame erasure ratio of the received signal, and the step of sending in the uplink direction a signal representing the stored information about errors comprises the step of sending in the uplink direction a signal representing the detected frame erasure ratio.

4. A method according to claim 1 comprising the steps of:

receiving a command of a certain first protocol level in the downlink direction, in response to the received command, setting the mobile station into a test mode where no notification about an established bi-directional communication link is sent to protocol levels higher than said first protocol level.

5. A method according to claim 4, wherein said first protocol level is a Layer 3 RR level.

6. A method according to claim 1 wherein in a mobile station equipped for converting a downlink signal to baseband and for demodulating, decrypting and channel decoding the signal converted to baseband, the step of comparing the received test signal to a known form of the test signal is performed after demodulation and decryption but prior to channel decoding.

7. A method according to claim 1 wherein in a mobile station equipped for converting a downlink signal to baseband and for demodulating, decrypting and channel decoding the signal converted to baseband, the step of comparing the received test signal to a known form of the test signal is performed after demodulation, decryption and channel decoding.

8. The method of claim 1 further comprising:

using an uplink data connection for the uplink direction; and using a downlink data connection for the downlink direction;

wherein the uplink data connection is not associated with the downlink data connection.

9. The method of claim 1 wherein the step of sending in the uplink direction further comprises using a short-range wireless data link to send the signal representing the stored information about errors.

10. A method for testing the functioning of downlink data communication in a cellular radio system, comprising the steps of:

sending a test signal from a base station to at least one mobile station, receiving the test signal sent by the base station at a mobile station, generating a pseudorandom bit sequence at the mobile station in order to produce a known form of the test signal, comparing the test signal received at the mobile station to the known form of the test signal, producing and temporarily storing at the mobile station information about errors which were detected in the received test signal during the comparing step, sending information representing the stored information about errors from the mobile station to a base station, receiving the information sent by the mobile station at a base station, and storing the information received by the base station in the cellular radio system.

11. A method according to claim 10, comprising the steps of:

sending a test signal from a large number of base stations to a large number of mobile stations, receiving information sent by a large number of mobile stations at a large number of base stations, storing the information received by the base stations at a control station of the cellular radio system, and producing, at the control station, information representing the quality of downlink data communication in the cellular radio system.

12. A mobile station of a cellular radio system, comprising:

reception means for receiving a signal in the downlink direction, transmission means for sending a signal in the uplink direction, comparison means for comparing a received test signal to a known form of the test signal, generating means for generating a pseudorandom bit sequence in order to produce the known form of the test signal, means for producing and temporarily storing information about errors which were detected in the received test signal by said comparison means, and uplink sending means for sending in the uplink direction a signal representing the stored information about errors.

13. A mobile station according to claim 12, comprising
downconversion means for converting received downlink data to baseband,
a demodulator for demodulating the data converted to baseband,
decrypting means for decrypting the demodulated data,
a channel decoder for channel decoding the demodulated and decrypted data,
a channel encoder for channel encoding uplink data,
encrypting means for encrypting the channel encoded uplink data,
a modulator for modulating the encrypted channel encoded uplink data onto baseband oscillations, and
upconversion means for converting the modulated baseband oscillations onto a transmission frequency for transmitting,
wherein said comparison means, said means for producing and temporarily storing information about errors and said uplink sending means are arranged to establish a coupling from the output of the decrypting means to the input of the encrypting means.

14. A mobile station according to claim 12, comprising
downconversion means for converting received downlink data to baseband,
a demodulator for demodulating the data converted to baseband,
decrypting means for decrypting the demodulated data,
a channel decoder for, channel decoding the demodulated and decrypted data,
a channel encoder for channel encoding uplink data,
encrypting means for encrypting the channel encoded uplink data,
a modulator for modulating the encrypted channel encoded uplink data onto baseband oscillations, and
upconversion means for converting the modulated baseband oscillations onto a transmission frequency for transmitting,
wherein said comparison means, said means for producing and temporarily storing information about errors and said uplink sending means are arranged to establish a coupling from the output of the channel decoder to the input of the channel encoder.

15. A method for using a mobile station for testing the functioning of downlink data communication in a cellular radio system, comprising the steps of:
receiving a test signal in the downlink direction at the mobile station;
generating a pseudorandom bit sequence at the mobile station in order to produce a known form of the test signal;
comparing the received test signal to the known form of the test signal;
producing and temporarily storing information about errors which were detected in the received test signal during the comparing step; and
sending in the uplink direction a signal representing the stored information about errors.

16. A method for testing the functioning of downlink data communication in a mobile station equipped for receiving a signal in the downlink direction and for sending a signal in the uplink direction, the method comprising the steps of:
receiving a test signal in the downlink direction;
comparing the received test signal to a known form of the test signal;
producing and temporarily storing information about errors which were detected in the received test signal during the comparing step; and
sending in the uplink direction a signal representing the stored information about errors;
wherein in a mobile station equipped for converting a downlink signal to baseband and for demodulating, decrypting and channel decoding the signal converted to baseband, the step of comparing the received test signal to a known form of the test signal is performed after demodulation and decryption but prior to channel decoding.

17. A method for testing the functioning of downlink data communication in a mobile station equipped for receiving a signal in the downlink direction and for sending a signal in the uplink direction, the method comprising the steps of:
receiving a test signal in the downlink direction;
comparing the received test signal to a known form of the test signal;
producing and temporarily storing information about errors which were detected in the received test signal during the comparing step; and
sending in the uplink direction a signal representing the stored information about errors;
wherein in a mobile station equipped for converting a downlink signal to baseband and for demodulating, decrypting and channel decoding the signal converted to baseband, the step of comparing the received test signal to a known form of the test signal is performed after demodulatin, decryption and channel decoding.

18. A mobile station of a cellular radio system, comprising:
reception means for receiving a signal in the downlink direction;
transmission means for sending a signal in the uplink direction;
comparison means for comparing a received test signal to a known form of the test signal;
means for producing and temporarily storing information about errors which were detected in the received test signal by said comparison means; and
uplink sending means for sending in the uplink direction a signal representing the stored information about errors;
downconversion means for converting received downlink data to baseband;
a demodulator for demodulating the data converted to baseband;
decrypting means for decrypting the demodulated data;
a channel decoder for channel decoding the demodulated and decrypted data;
a channel encoder for channel encoding uplink data;
encrypting means for encrypting the channel encoded uplink data;
a modulator for modulating the encrypted channel encoded uplink data onto baseband oscillations; and
upconversion means for converting the modulated baseband oscillations onto a transmission frequency for transmitting;
wherein said comparison means, said means for producing and temporarily storing information about errors and said uplink sending means are arranged to establish a coupling from the output of the decrypting means to the input of the encrypting means.

19. A mobile station of a cellular radio system, comprising:
- reception means for receiving a signal in the downlink direction;
- transmission means for sending a signal in the uplink direction;
- comparison means for comparing a received test signal to a known form of the test signal;
- means for producing and temporarily storing information about errors which were detected in the received test signal by said comparison means; and
- uplink sending means for sending in the uplink direction a signal representing the stored information about errors;
- downconversion means for converting received downlink data to baseband;
- a demodulator for demodulating the data converted to baseband; decrypting means for decrypting the demodulated data;
- a channel decoder for channel decoding the demodulated and decrypted data;
- a channel encoder for channel encoding uplink data;
- encrypting means for encrypting the channel encoded uplink data;
- a modulator for modulating the encrypted channel encoded uplink data onto baseband oscillators; and
- upconversion means for converting the modulated baseband oscillators onto a transmission frequency for transmitting;
- wherein said comparison means, said means for producing and temporarily storing information about errors and said uplink sending means are arranged to establish a coupling from the output of the channel decoder to the input of the channel encoder.

* * * * *

UNITED STATES PATENT AND TRADEMARK OFFICE
CERTIFICATE OF CORRECTION

PATENT NO.     : 6,687,499 B1
DATED          : February 3, 2004
INVENTOR(S)    : Numminen et al.

It is certified that error appears in the above-identified patent and that said Letters Patent is hereby corrected as shown below:

<u>Title page,</u>
Insert Item:
-- [30]  Foreign Application Priority Data
        March 29, 1999  (FI) ……………………….. 1999-990690 --

Signed and Sealed this

Eighteenth Day of May, 2004

JON W. DUDAS
*Acting Director of the United States Patent and Trademark Office*